(12) United States Patent
Martin et al.

(10) Patent No.: US 10,356,180 B2
(45) Date of Patent: *Jul. 16, 2019

(54) METHOD FOR PROCESSING VEHICLE-TO-X MESSAGES

(71) Applicant: Continental Teves AG & Co. oHG, Frankfurt (DE)

(72) Inventors: Torsten Martin, Steinbach/Taunus (DE); Marc Menzel, Weimar (DE); Richard Scherping, Liederbach am Taunus (DE); Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,534

(22) Filed: Aug. 9, 2017

(65) Prior Publication Data

US 2018/0069928 A1 Mar. 8, 2018

(30) Foreign Application Priority Data

Sep. 8, 2016 (DE) .................. 10 2016 217 099

(51) Int. Cl.
*G08G 1/16* (2006.01)
*H04L 29/08* (2006.01)
*H04W 84/00* (2009.01)
*H04W 92/18* (2009.01)
*H04W 12/10* (2009.01)
*H04W 4/40* (2018.01)

(52) U.S. Cl.
CPC ............. *H04L 67/12* (2013.01); *G08G 1/161* (2013.01); *H04W 4/40* (2018.02); *H04W 12/10* (2013.01); *H04W 84/005* (2013.01); *H04W 92/18* (2013.01)

(58) Field of Classification Search
CPC ........ H04L 67/12; H04W 4/40; H04W 12/10; H04W 84/005; H04W 92/18; G08G 1/161
See application file for complete search history.

(56) References Cited

U.S. PATENT DOCUMENTS

2016/0080517 A1 3/2016 Decker et al.
2018/0067789 A1* 3/2018 Martin .................... G06F 9/546

FOREIGN PATENT DOCUMENTS

DE 102010002092 A1 12/2010

OTHER PUBLICATIONS

German Search Report for German Application No. 10 2016 217 099.6, dated Mar. 22, 2017, including partial English translation, 11 pages.
Krishnan, H., "Verify-on-Demand—A Practical and Scalable Approach for Broadcast Authentication in Vehicle Safety Communication", Oct. 2, 2008, IP.com No. IPCOM000175512D, XP013126503. 10 pages.
Non Final Office Action for U.S. Appl. No. 15/642,421, dated Apr. 5, 2019, 14 pages.

* cited by examiner

*Primary Examiner* — Ryan W Sherwin
(74) *Attorney, Agent, or Firm* — RatnerPrestia

(57) ABSTRACT

A method for processing vehicle-to-x messages in a processing module and a method for processing vehicle-to-x messages in a control module. In this way, the data traffic between processing module and control module can be considerably reduced.

18 Claims, 1 Drawing Sheet

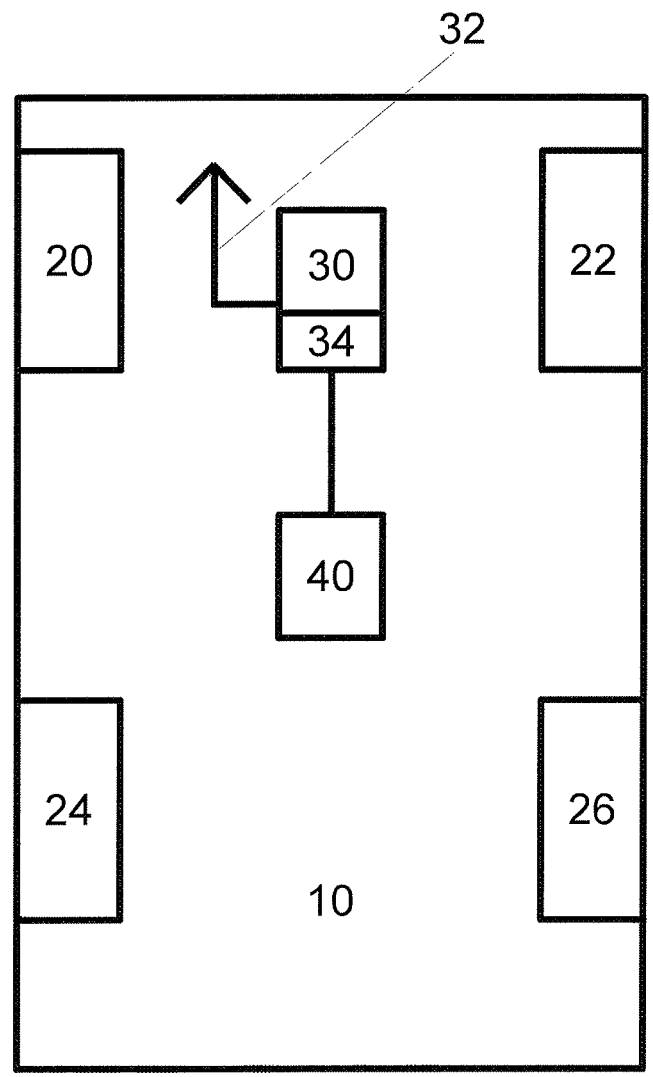

METHOD FOR PROCESSING VEHICLE-TO-X MESSAGES

CROSS REFERENCE TO RELATED APPLICATIONS

This application claims priority to German Patent Application 10 2016 217 099.6, filed Sep. 8, 2016, the contents of such application being incorporated by reference herein.

FIELD OF THE INVENTION

The invention concerns a method for processing vehicle-to-x messages in a processing module and a method for processing vehicle-to-x messages in a control module.

BACKGROUND OF THE INVENTION

Vehicle-to-x communication, also known as car-to-X communication, or C2X or V2X communication for short, is at the state of the art research or advanced development stage and is currently in the standardization phase. Here, in particular standard IEEE 802.11p can be used as a basis.

Since such communication is highly critical for road traffic, typically security against manipulation is necessary. For this, particularly, a method can be used in which the communication can be made verifiable using cryptographic checksums. These checksums are typically based on asymmetric cryptographic methods, by way of example ECDSA. As the basis for such verification, all authorized vehicles are registered with the public keys used by them via a central infrastructure, which can also be referred to as a Public Key Infrastructure (PKI).

It has been shown that the verification of all messages incoming to, or received by, a vehicle, requires a great deal of computing power, making suitable solutions more expensive. Rather than this verify-all approach, therefore, the verification-on-demand approach has now been developed, in which messages are only checked where they are considered important for applications or classified as important by another algorithm. A verification-on-demand approach thus saves a considerable amount of computing power compared to a verify-all approach.

Typically attempts are made to structurally combine those elements that are absolutely essential for vehicle-to-x communication or where the vehicle-to-x communication differs from existing solutions in the vehicle. This mainly involves a transceiver and a security support. The applications, however, can to some extent be accommodated by existing control units.

Such a distributed design, however, presents difficulties for the verification-on-demand approach, since the decision on whether a message is important or not is taken in a control unit where there is a lack of security solutions or security, since these are accommodated in the device specific to the vehicle-to-x communication.

SUMMARY OF THE INVENTION

An aspect of the invention, therefore, proposes measures which, particularly, facilitate implementation of security solutions in vehicle-to-x communication.

An aspect of the invention concerns a method for processing vehicle-to-x messages in a processing module. Such a processing module is typically a module in which incoming or received vehicle-to-x messages are available at the start, or at a very early stage of the processing within a vehicle. Particularly, vehicle-to-x messages are typically received upstream of the control module described below.

The method has the following steps:
  receiving a number of vehicle-to-x messages,
  saving of the vehicle-to-x messages in a buffer memory,
  forwarding the vehicle-to-x messages to at least one control module,
  receiving a checking request from the control module for at least one of the vehicle-to-x messages, in response performing a verification of this vehicle-to-x message and sending a result of this verification to the control module.

By means of the method according to an aspect of the invention, it is possible to verify only those vehicle-to-x messages for which this is actually also considered necessary by a control module. Here, a control module is typically a module which runs an application in which vehicle-to-x messages are processed.

Storing of vehicle-to-x messages in the buffer memory means that here it is no longer necessary to send back the vehicle-to-x message to be verified from the control module to the processing module, rather it is sufficient to transmit substantially shorter information that is adequate for identifying the stored message.

It is understood that both when storing a vehicle-to-x message and also when forwarding a vehicle-to-x message the respective vehicle-to-x message can be both completely stored or forwarded or also stored or forwarded in part. This is dealt with in more detail further on.

According to a preferred embodiment the method also has the following step:
  performing a preprocessing of the vehicle-to-x messages, wherein as a function of the preprocessing only part of the vehicle-to-x messages is stored and/or sent.

In this way the number of vehicle-to-x messages that actually have to be processed, by way of example, stored or transmitted can typically be significantly reduced, since during a preprocessing messages are eliminated which are unimportant for the respective vehicle.

According to a preferred embodiment, the vehicle-to-x messages are forwarded without their respective components that are to be detached, particularly security parts. In this way, the data traffic can be further reduced since only those parts of a respective vehicle-to-x message are forwarded to the control module which are also relevant for the control module. Here, security parts which are merely necessary for verification can typically be excluded from the forwarding.

According to a development, the method also has the following steps:
  identification of a low system load of the processing modules, and in response
  performing a verification of stored vehicle-to-x messages.

This allows phases of low system loading of the processing module to be utilized, when therefore the processing module, by way of example, is not directly engaged in performing other tasks. By way of example, for the system load a value of a processor usage can be used. It can, by way of example, be provided that this verification, intended to take place in response to the low system load, is triggered when the system load, thus, by way of example, a processor usage, falls below a certain threshold value or a certain threshold value for a specified time.

According to a preferred embodiment the method also has the following step:
  receiving an amount of prioritization information for the stored vehicle-to-x messages, wherein during the verification in response to low system load a sequence of vehicle-to-x messages to be verified is determined based on the prioritization information.

This allows a prioritization of the stored vehicle-to-x messages based on requirements, particularly of control modules, so that the messages verified first are the ones most important for the applications.

It is understood that a prioritization of messages can also be considered an independent aspect of the invention which can be implemented regardless of the distribution in the processing module and control module. The prioritization can, particularly, be used to determine a sequence in which messages are verified, by way of example, without a specific request for this and/or where there is low system load.

According to a preferred embodiment, upon receipt of a checking request for a message that has already been verified a result of this verification is sent to the control module. In this way, a verification can be used which was already carried out in a phase of low system load, and a repeat verification with corresponding time delay avoided. This also allows a better utilization of the computing capacity of the processing module to be achieved.

Preferably, for each message stored in the buffer memory an identifier to identify the vehicle-to-x message is stored. Here a respective checking request typically contains a respective identifier of the vehicle-to-x message to be verified. This can considerably reduce the amount of data traffic between processing module and control module, particularly compared to a complete transmission of the message.

As the identifier of a respective vehicle-to-x message particularly a component of the vehicle-to-x message can be used. Here identifiers or components can be used which typically are contained in vehicle-to-x messages for identification any way. A separate identifier can also be generated, however, and used accordingly.

According to a preferred embodiment the method also has the following step:
 in response to performing a verification for a vehicle-to-x message, removing the vehicle-to-x message from the buffer memory.

This allows space to be released in the buffer memory, particularly for those vehicle-to-x messages which have already been verified and for which, therefore, further storage is typically no longer necessary. Particularly, vehicle-to-x messages that have already been forwarded can be removed. By way of example, merely an identifier and the result of the verification can continue to be stored once the respective message has been removed.

According to a development the method also has the following step:
 in response to performing a verification immediately sending a result of the verification to the control module.

This allows a further reduction in the number of steps necessary in the event of the control module classifying a message as necessary that has already been verified. In this case sending the checking request to the processing module can be dispensed with, since the necessary result is already present in the control module.

It is understood that the above-mentioned steps (particularly intermediate storage of results of the verification in the processing module, and immediate sending of verification results) can be implemented in each case individually or also in combination.

An aspect of the invention further concerns a method for processing vehicle-to-x messages in a control module, having the following steps:

receiving a number of vehicle-to-x messages from a processing module,
 determining for each of the vehicle-to-x messages, whether the respective vehicle-to-x-message is to be verified and in response to a respective vehicle-to-x message needing to be verified sending a checking request for this vehicle-to-x message to the processing module.

This method particularly constitutes the counterpart to the above-mentioned method but now in a control module. A control module involves, as mentioned above, typically a module in which applications are run which use vehicle-to-x messages. By way of example, this can involve a function for autonomous guidance or collision prevention.

According to one configuration the method has the following step:
 determining the prioritization information based on vehicle-to-x participants.

According to one configuration the method has the following step:
 sending a checking request based on vehicle-to-x participants to the processing module.

These steps particularly endorse the fact that algorithms used in the vehicle-to-x communication typically count on objects which send vehicle-to-x messages. Such an object can, by way of example, be another vehicle in the environment or another vehicle-to-X participant. Vehicle-to-x messages typically contain identification information, based on which vehicle-to-x messages can be assigned to the respective vehicle-to-x participants.

Given that the control module now bases its feedback to the processing module using these object identifications, the communication between control module and processing module can be further optimized because a single piece of prioritization information can potentially be applied to several vehicle-to-x messages.

In addition, the processing module can accept such prioritization information automatically for all further vehicle-to-x messages, received from the same vehicle-to-X participant, without additional updating by the control module being necessary.

Through an exchange of prioritization information and checking requests based on an identification of the vehicle-to-X participants, identifying all associated vehicle-to-x messages (including those not yet received), a particular simplification can be achieved.

A control module can now itself decide for which messages, based on criticality, a verification is indicated and accordingly by sending a checking request for this vehicle-to-x message trigger a verification.

According to a preferred embodiment the method further has the following step:
 performing a decoding, particularly an ASN.1 decoding, for the vehicle-to-x messages.

It should be pointed out that this step is particularly advantageously carried out in the control module and not in the verification module, since it is typically unnecessary for the verification. Advantageously, therefore, a decoding step, particularly an ASN.1 decoding, for the vehicle-to-x messages is not performed in the processing module. It is understood, however, that it is basically also possible to perform such a decoding step in the processing module.

According to a preferred embodiment, the method further has the following step:
 receiving respective results of the verification for the vehicle-to-x messages.

In this way the control module receives a result of the verification, and can therefore in the event of a positive result particularly be certain that a valid message is involved, or in the event of a negative result can no longer rely on the respective message.

According to a preferred embodiment the method further has the following step:

determining and sending respective prioritization information for the vehicle-to-x messages to the processing module.

This prioritization information can particularly be based on internal calculations or other algorithms, which determine a relevance of a respective vehicle-to-x message for the control module. It may also be a case of the relevance of certain groups or types of vehicle-to-x messages. This helps the processing module in selecting messages which during a verification in response to a low system load or also otherwise are to be verified first and/or to determine a corresponding sequence. This allows the particularly relevant messages to be verified first, so that these have a high probability of already having been verified if a verification is necessary.

Each checking request preferably contains a respective identifier of the message to be verified. This allows the respective message to be clearly identified. Complete sending of the respective message or sending a substantial part of this can advantageously be dispensed with.

An aspect of the invention further concerns a method for processing vehicle-to-x messages in a processing module and a control module, wherein the processing module performs a method like that described above in relation to a method a to be performed in a processing module, and wherein the control module performs a method like that described above in relation to be performed in a control module. Regarding the respective method in a processing module or in a control module, all described configurations and variants can be used here. Thus, in particular, a particularly good interaction between the processing module and control module can be achieved. It is understood that from one processing module typically a plurality of control modules can be supplied with vehicle-to-x messages. The method described here is therefore correspondingly expandable to a plurality of control modules or also to a plurality of processing modules, able here to work together.

An aspect of the invention further concerns a processing module, configured to perform a method like that described above in relation to a method to be performed in a processing module. The invention further concerns a control module, configured to perform a method like that described above in relation to a method to be performed in a control module. Regarding the respective method, all configurations and variants described herein can be used.

The invention further relates to a non-volatile machine-readable storage medium, containing program code, the execution of which by a processor performs a method according to the invention. Here, all embodiments and variants described herein can be used.

It can generally be said here that the invention, by way of example, concerns a distributed system. Here vehicle-to-x messages are, by way of example, forwarded by a processing module to a control module. At the same time, the processing module is able to store the messages temporarily in a buffer memory. If the control module requires the verification of a message, then unlike with the previous systems it does not have to send back the entire message to the processing module for verification, only a message identification or ID. Using the ID, the processing module is able to find the message to be verified in the buffer memory, verify it in a security unit and then send back the result of the verification to the control module. Here the messages are always stored in the buffer memory in original form, to allow a verification.

For the transmission of the messages between the two modules the security part of the message can be cut off, since the control module does not need it in any case. This saves considerable bandwidth for the communication between the two modules.

For the identification or ID, an ID of the message received can be used directly, which saves the effort of double book-keeping. A new ID can also be used, however, optimized to allow the message to be found as quickly as possible in the buffer memory. Ideally, in the processing module a reduction in the messages handed over takes place through preprocessing. This allows the number of messages stored in the buffer memory for a possible verification to be significantly reduced. The size of the buffer memory is typically selected dependent upon the reduction method, the application types (by way of example, based on event messages or periodic messages) and the application logic (how old messages can still be taken into consideration).

In a preferred embodiment for the identification or identifier, the ID of the vehicle-to-X participant sending the corresponding message can also be considered. Based on this information, the processing module can accordingly automatically classify all messages received from the same participant. This embodiment is particularly expedient if the algorithms used in the system calculate based on objects rather than individual messages.

To save computing time in the processing module, the ASN.1 decoding may, by way of example, only take place in the control module. The content of the ASN.1-coded part of the messages is typically not needed in the processing module, for which reason no restrictive functionality is involved. Where very dissimilar numbers of messages are received per unit of time, if there is any remaining computing power for verifications a verification of the messages in the buffer memory is performed on spec. Should such a previously checked message then be requested by the applications for checking, the time lag until the response can be considerably reduced. Ideally for this checking on spec, for each message in the buffer memory the checking status is recorded. Messages that have already been forwarded to the control module as checked can typically be removed from the buffer memory since the control module can now store the message itself as checked. Alternatively, or additionally, the processing module can forward the result of any verification or on spec verification directly to the control module, in order to reduce even further the time lag where a verification is necessary.

The checking on spec can ideally be optimized by the control module providing feedback for each message received (for example "unimportant", "potentially important", "very important"). The control module can, based on this feedback, sort the as yet unchecked messages for verification according to criticality. Thus, by way of example, where there is a high processing load only the messages notified as "very important" are verified. With lower processing load the messages classified as "potentially important" can similarly be checked or verified.

The communication between the two modules can be encrypted or at least safeguarded to increase the security level. To this end a public key infrastructure is not absolutely necessary, however; a symmetrical encryption method such as AES is sufficient which does not need to have any connection with the security system of the vehicle-to-x communication.

In a special variant, the functions are not distributed between various control units or modules, but across various partitions of control software or module software, which can be represented as virtually separate control units or modules. The communication between partitions in this case typically takes place via a virtual bus, for example interprocess communication ports. All other mechanisms described are identically applicable.

The system described for the security checking or verification in a distributed vehicle-to-X system allows applications to be accommodated in existing control units or modules, without the control units requiring corresponding security mechanisms. This allows vehicle-to-X, including security-on-demand, to be integrated very easily into existing vehicle architectures.

The distribution across various partitions of a control unit or module offers the advantage that the functions described can be integrated into various operating systems. The implementations of transceiver drivers, protocol stack and security libraries are often designed for POSIX/Linux-like systems. The app calculation, on the other hand can, for example, take place in an AUTOSAR-like operating system, for example if an OEM wishes to integrate its own applications into the control unit or the module. With the invention described, both worlds can be combined in one control unit or module with minimal effort.

BRIEF DESCRIPTION OF THE DRAWINGS

Further features and advantages will be indicated to the person skilled in the art by reference to the exemplary embodiments described in the attached drawing. This shows as follows:

FIG. 1: a vehicle configured to perform a method according to the invention.

DETAILED DESCRIPTION OF THE PREFERRED EMBODIMENTS

FIG. 1 shows a vehicle 10, configured to perform a method according to the invention according to a possible exemplary embodiment.

Here the vehicle 10 is shown merely schematically. A left front wheel 20, a right front wheel 22, a left rear wheel 24 and a right rear wheel 26 are shown.

The vehicle 10 has a processing module 30. The processing module 30 is connected to an antenna 32, configured to receive vehicle-to-x messages. Thus, all vehicle-to-x messages, receivable in the area in which the vehicle 10 is located, are received by the processing module 30.

The processing module 30 further has a buffer memory 34.

Furthermore, the vehicle 10 has a control module 40. This control module 40 is similarly shown merely schematically here and is configured to run one or more applications, for which vehicle-to-x messages are used. By way of example, it can be a case here of a function for autonomous guidance or collision avoidance. It is understood that the vehicle 10 can also have a number of control modules, which can function correspondingly.

The processing module 30 and the control module 40 are connected to one another as shown, for exchange of data. Here, the implemented functionality runs as described below.

When there is an incoming vehicle-to-x message, received via the antenna 32, initially a preprocessing is performed, in order to determine if the corresponding vehicle-to-x message may actually be relevant to the vehicle 10. In the case of a message which is manifestly irrelevant for the vehicle 10 this will be immediately rejected.

Then the respective vehicle-to-x message is stored in the buffer memory 34 and also forwarded to the control module 40.

The control module 40 checks if the vehicle-to-x message has sufficient security relevance for a verification to be necessary. If so, then a checking request is sent with an identification of the vehicle-to-x message back to the processing module 30. Here, particularly, an ID of a vehicle-to-x message can be used which is typically already present in this message any way.

In response to the receipt of such as checking request, the processing module 30 verifies the respective vehicle-to-x message stored in the buffer memory. The result of this can be that the vehicle-to-x message is either secure or non-secure. This result is sent to the control module 40. The control module 40 thus knows if the respective vehicle-to-x message is secure and thus reliable or not. By way of example, in the case of a non-secure vehicle-to-x message use of this for the purposes of autonomous vehicle guidance can be dispensed with.

Where for a vehicle-to-x message a verification is not, or at least not directly, necessary, the control module 40 sends respective prioritization information regarding the vehicle-to-x message back to the processing module 30. In doing so an indication is given of how important the control module 40 considers the respective vehicle-to-x message. A higher priority value can, particularly, be indicated, the greater the probability is that a verification of this vehicle-to-x message will still actually be necessary.

If a processor load of a processor of the processing module 30 drops below a certain threshold, then the processing module 30 verifies the vehicle-to-x messages stored in the buffer memory 34 irrespective of the existence of a concrete checking request for this. Should then a checking request arrive, then the respective result of the verification will already be available and can be sent immediately to the control module 40.

Verified vehicle-to-x messages are typically deleted from the buffer memory 34, wherein for the saving of the result of a verification storage of the ID or identifier and result of the verification is sufficient. This allows significant amounts of memory space to be saved.

Compared with embodiments known from the state of the art in which the complete vehicle-to-x message has to be sent from the control module 40 back to the processing module 30, with the embodiment according to the invention as per the exemplary embodiment shown, considerable quantities of necessary transmission capacity between the processing module 30 and the control module 40 can be saved.

It can generally be said that vehicle-to-X communication particularly means direct communication between vehicles and/or between vehicles and infrastructure facilities. By way of example, therefore, vehicle-to-vehicle communication or vehicle-to-infrastructure communication may be involved. Where in the context of this application reference is made to communication between vehicles, this can essentially take place by way of example in the context of a vehicle-to-vehicle-communication, which typically takes place without the intermediary of a cellular network or a similar external infrastructure and which therefore can be differentiated from other solutions which, by way of example, are based on a cellular network. By way of example, vehicle-to-X communication can use the standards IEEE 802.11p or IEEE1609.4. Vehicle-to-X communication can also be referred to as C2X communication. The subareas can be referred to as C2C (Car-to-Car) or C2I (Car-to-Infrastructure). However, the invention does not expressly exclude vehicle-to-X communication with the intermediary of, by way of example, a cellular network.

Steps of the method according to the invention that have been mentioned can be performed in the sequence indicated. They can, however, also be performed in another sequence. The method according to the invention can be performed in one of its embodiments, by way of example, with a certain combination of steps, in such a way that no further steps are performed. Further steps can basically also be performed, however, even if not mentioned.

The claims in the application do not mean that the achievement of more far-reaching protection has been abandoned.

Where in the course of the method it transpires that a feature or a group of features is not absolutely necessary, then the applicant here and now seeks a wording of at least one independent claim, which no longer comprises the feature or group of features. It may, by way of example, be a matter here of a sub-combination of a claim existing on the application date or a sub-combination restricted by further features of a claim existing on the application date. Such newly worded claims or combinations of features are understood to be covered by the disclosure of this application.

It is further pointed out that configurations, features and variants of the invention, which are described in the various embodiments or exemplary embodiments and/or shown in the figures, can be combined freely with one another. Individual or multiple features are freely exchangeable with one another. Resulting combinations of features are understood to be covered by the disclosure of this application.

References back to dependent claims shall not mean that the achievement of independent, objective protection for the features of the subclaims referred back to has been abandoned. These features also can be freely combined with one another.

Features which are merely disclosed in the description or features which are disclosed in the description or in a claim only in combination with other features, can basically be of independent and essential importance to the invention. They may therefore also be used individually for delimitation from the state of the art in claims.

The invention claimed is:

1. A method for processing vehicle-to-x messages in a processing module, comprising:
   receiving a number of vehicle-to-x messages,
   storing the vehicle-to-x messages in a buffer memory,
   forwarding the vehicle-to-x messages to at least one control module, and
   receiving a checking request from the control module for at least one of the vehicle-to-x messages, in response performing a verification of the at least one vehicle-to-x message and sending a result of the verification to the at least one control module.

2. The method according to claim 1, further comprising: performing a preprocessing of the vehicle-to-x messages, wherein as a function of the preprocessing only part of the vehicle-to-x messages is stored and/or sent.

3. The method according to claim 1,
   wherein the vehicle-to-x messages are forwarded without their respective security parts that are to be detached.

4. The method according to claim 1,
   wherein for each message stored in the buffer memory an identifier to identify the vehicle-to-x message is stored, and
   wherein a respective checking request contains a respective identifier of the vehicle-to-x message to be verified.

5. The method according to claim 4,
   wherein as the identifier of a respective vehicle-to-x message a component of the vehicle-to-x message can be used or a separate identifier is generated.

6. The method according to claim 1, further comprising:
   in response to performing a verification for a vehicle-to-x message, removing the vehicle-to-x message from the buffer memory and/or immediately sending a result of the verification to the at least one control module.

7. A method for processing vehicle-to-x messages in a processing module, comprising:
   receiving a number of vehicle-to-x messages,
   storing the vehicle-to-x messages in a buffer memory,
   forwarding the vehicle-to-x messages to at least one control module, and
   identifying a low system load of the processing module, and in response performing a verification of the stored vehicle-to-x messages.

8. The method according to claim 7, further comprising:
   receiving an amount of prioritization information for the stored vehicle-to-x messages,
   wherein during the verification in response to the low system load a sequence of vehicle-to-x messages to be verified is determined based on the prioritization information.

9. The method according to claim 8,
   wherein upon receipt of a checking request for a message that has already been verified a result of this verification is sent to the at least one control module.

10. The method according to claim 7,
    wherein upon receipt of a checking request for a message that has already been verified a result of this verification is sent to the control module.

11. A method for processing vehicle-to-x messages in a control module, comprising:
    receiving a number of vehicle-to-x messages from a processing module, and
    determining for each of the vehicle-to-x messages whether the respective vehicle-to-x-message is to be verified and in response to a respective vehicle-to-x message needing to be verified sending a checking request for this vehicle-to-x message to the processing module.

12. The method according to claim 11, further comprising:
    performing a decoding for the vehicle-to-x messages.

13. The method according to claim 12, further comprising:
    receiving respective results of a verification for the vehicle-to-x messages.

14. The method according to claim 11, further comprising:
    receiving respective results of a verification for the vehicle-to-x messages.

15. The method according to claim 11, further comprising:
    determining and sending respective prioritization information for the vehicle-to-x messages to the processing module.

16. The method according to claim 11,
wherein each checking request contains a respective identifier of the message to be verified.

17. The method according to claim 11, further comprising:
performing an ASN.1 decoding for the vehicle-to-x messages.

18. A method for processing vehicle-to-x messages in a processing module and a control module, wherein
the processing module performs a method comprising:
receiving a number of vehicle-to-x messages,
storing the vehicle-to-x messages in a buffer memory,
forwarding the vehicle-to-x messages to at least one control module, and
receiving a checking request from the at least one control module for at least one of the vehicle-to-x messages, in response performing a verification of the at least one vehicle-to-x message and sending a result of the verification to the control module; and
the control module performs a method comprising:
receiving a number of vehicle-to-x messages from a processing module, and
determining for each of the at least one vehicle-to-x messages whether the respective vehicle-to-x-message is to be verified and in response to a respective vehicle-to-x message needing to be verified sending a checking request for this the at least one vehicle-to-x message to the processing module.

* * * * *